United States Patent
Huang

(10) Patent No.: US 11,429,275 B2
(45) Date of Patent: *Aug. 30, 2022

(54) ELECTRONIC DEVICE WITH GESTURE-BASED TASK MANAGEMENT

(71) Applicant: Google Technology Holdings LLC, Mountain View, CA (US)

(72) Inventor: Meng Huang, Beijing (CN)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/346,992

(22) Filed: Jun. 14, 2021

(65) Prior Publication Data

US 2021/0303150 A1 Sep. 30, 2021

Related U.S. Application Data

(63) Continuation of application No. 15/971,833, filed on May 4, 2018, now Pat. No. 11,036,389, which is a (Continued)

(51) Int. Cl.
*G06F 3/04886* (2022.01)
*G06F 3/04883* (2022.01)
(Continued)

(52) U.S. Cl.
CPC ........ *G06F 3/04886* (2013.01); *G06F 3/0487* (2013.01); *G06F 3/0488* (2013.01);
(Continued)

(58) Field of Classification Search
CPC ...... G06F 3/0488; G06F 9/451; G06F 9/4843; G06F 3/04886; G06F 3/04817; G06F 3/0487; G06F 3/04883; G06F 2203/04803
See application file for complete search history.

(56) References Cited

U.S. PATENT DOCUMENTS

| 5,621,878 A | 4/1997 | Owens et al. |
| 7,164,410 B2 | 1/2007 | Kupka |

(Continued)

FOREIGN PATENT DOCUMENTS

| CN | 101178710 A | 5/2008 |
| CN | 101672648 A | 3/2010 |

(Continued)

OTHER PUBLICATIONS

First Office Action, and translation thereof, from counterpart Chinese Patent Application No. 201180071826.1, dated Feb. 2, 2016 27 pp.

(Continued)

*Primary Examiner* — Cao H Nguyen
(74) *Attorney, Agent, or Firm* — Shumaker & Sieffert, P.A.

(57) ABSTRACT

An electronic device includes a display screen for displaying (302) an active first application, a movement sensing assembly for providing signals indicative of movement of an object with respect to the display screen, and a processor in electronic communication with the movement sensing assembly and the display screen. The processor evaluates the signals from the movement sensing assembly to identify (304) a subdividing gesture, and instructs the display screen to display (306) the first application in a first portion of the display screen to one side of the subdividing gesture.

20 Claims, 7 Drawing Sheets

Related U.S. Application Data continuation of application No. 14/127,567, filed as application No. PCT/CN2011/076010 on Jun. 21, 2011, now Pat. No. 9,983,786.

(51) Int. Cl.
  *G06F 3/04817*    (2022.01)
  *G06F 3/0487*     (2013.01)
  *G06F 3/0488*     (2022.01)

(52) U.S. Cl.
  CPC ...... *G06F 3/04817* (2013.01); *G06F 3/04883* (2013.01); *G06F 2203/04803* (2013.01)

(56) References Cited

U.S. PATENT DOCUMENTS

| | | | |
|---|---|---|---|
| 7,721,197 | B2 | 5/2010 | Baudisch et al. |
| 9,971,833 | B2 | 5/2018 | Balz |
| 2009/0106694 | A1 | 4/2009 | Kraft et al. |
| 2010/0066698 | A1* | 3/2010 | Seo ............... G06F 3/04883 345/173 |
| 2011/0164062 | A1* | 7/2011 | Nakamura ......... G01C 21/3667 345/660 |
| 2011/0175930 | A1* | 7/2011 | Hwang ............... G06F 3/0488 345/629 |
| 2012/0066650 | A1 | 3/2012 | Tirpak et al. |
| 2013/0050263 | A1* | 2/2013 | Khoe ............... G06F 3/04883 345/634 |

FOREIGN PATENT DOCUMENTS

| | | |
|---|---|---|
| CN | 101676853 A | 3/2010 |
| CN | 102045436 A | 5/2011 |
| CN | 103718150 A | 4/2014 |
| KR | 20110050248 A1 | 5/2011 |

OTHER PUBLICATIONS

First Office Action and Search Report, and translation thereof, from counterpart Chinese Application No. 201710532384.5, dated Dec. 2, 2019, 24 pp.
International Preliminary Report on Patentability from International Application No. PCT/CN2011/076010, dated Dec. 23, 2013, 6 pp.
MadeNCN, "Concept Line Phone", http://www.youtube.com/watch?v=mHLrPOTYNQg&, Jan. 18, 2011, 3 pages.
Notification on Grant of Patent Right from counterpart Chinese Patent Application No. 201180071826.1, dated May 3, 2017, 8 pp.
Patent Cooperation Treaty, "PCT Search Report and Written Opinion of the International Searching Authority" for International Application No. PCT/CN2011/076010 (CS37870), Mar. 15, 2012, 12 pages.
Prosecution History from U.S. Appl. No. 14/127,567, dated Dec. 19, 2013 through Jan. 31, 2018, 58 pp.
Response and translation thereof to the Decision of Rejection from counterpart Chinese Application No. 201710532384.5, dated Oct. 14, 2020, filed Dec. 8, 2020, 18 pp.
Second Office Action and translation thereof, from counterpart Chinese Application No. 201710532384.5, dated Apr. 28, 2020, 16 pp.
Second Office Action, and translation thereof, from counterpart Chinese Application No. 201180071826.1, dated Jul. 20, 2016, 16 pp.
Third Office Action, and translation thereof, from counterpart Chinese Patent Application No. 201180071826.1, dated Dec. 27, 2016 6 pp.
Prosecution History from U.S. Appl. No. 15/971,833, dated May 22, 2018 through Apr. 7, 2021, 102 pp.

* cited by examiner

ELECTRONIC DEVICE WITH GESTURE-BASED TASK MANAGEMENT

RELATED APPLICATION

This application is a continuation of U.S. patent application Ser. No. 15/971,833, filed 4 May 2018, which is a continuation of U.S. patent application Ser. No. 14/127,567, filed 18 Jun. 2014, which is a national stage entry of WO International Patent Application No. PCT/CN2011/076010, filed 21 Jun. 2011, the entire content of each application is incorporated herein by reference.

FIELD OF THE INVENTION

The present invention relates to a mobile electronic device with the ability to manage and switch between applications using gestures.

BACKGROUND

Portable electronic devices such as smart phones, personal digital assistants (PDAs), and tablets have become popular and ubiquitous. More and more features have been added to these devices, and they are often equipped with powerful processors, significant memory, and open operating systems, which allows for many different applications to be added. Popular applications provide functions such as calling, emailing, texting, image acquisition, image display, music and video playback, location determination (e.g., GPS), and internet browsing functions, among others. Further, such devices often include various user input components for communicating instructions to control operation of the electronic device. For example, many mobile devices are equipped not only with various buttons and/or keypads, but also with touch detecting surfaces (such as touch screens or touch pads) by which a user, simply by touching a particular area of the mobile device and/or by moving a finger along the surface of the mobile device, is able to communicate instructions to control the electronic device.

Often mobile electronic devices (such as smart phones) have limited display screen and user interface surface area due to the desire to keep the device portable. Generally with such devices, only a single application can be viewed at one time. Further, switching between applications often requires closing or at least pausing a currently running application. Thus, it is desirable to provide an electronic device with features to address these concerns.

DETAILED DESCRIPTION

A mobile electronic device with a display screen and a touch detecting surface (forming a touch screen) generates signals representative of user gestures. When an active application is running and displayed on the display screen, a user can divide the display screen into two portions with a subdividing gesture, which is detected and identified with the touch detecting surface and a processor. When a valid subdividing gesture is identified, the location of the subdividing gesture indicates a boundary between the two portions. The device is then controlled such that the active application is reduced in size and displayed in one of the portions. Optionally, a set of application icons for selection is displayed in the other portion. The user can then select a desired one of the application icons, and the application associated with the selection can be launched and displayed in the other portion (replacing the application icons). In this manner, two or more applications can be displayed at the same time, and data can be transferred between them using commonly known functions such as cut and paste, drag and drop, and the like. Further, the first active application can then be closed or minimized, and the second active application can be increased in size to be displayed on the entire display screen. In such a manner, simple and intuitive gestures can be used to allow for multiple applications to be displayed and managed, and to switch between applications.

Figure 1:
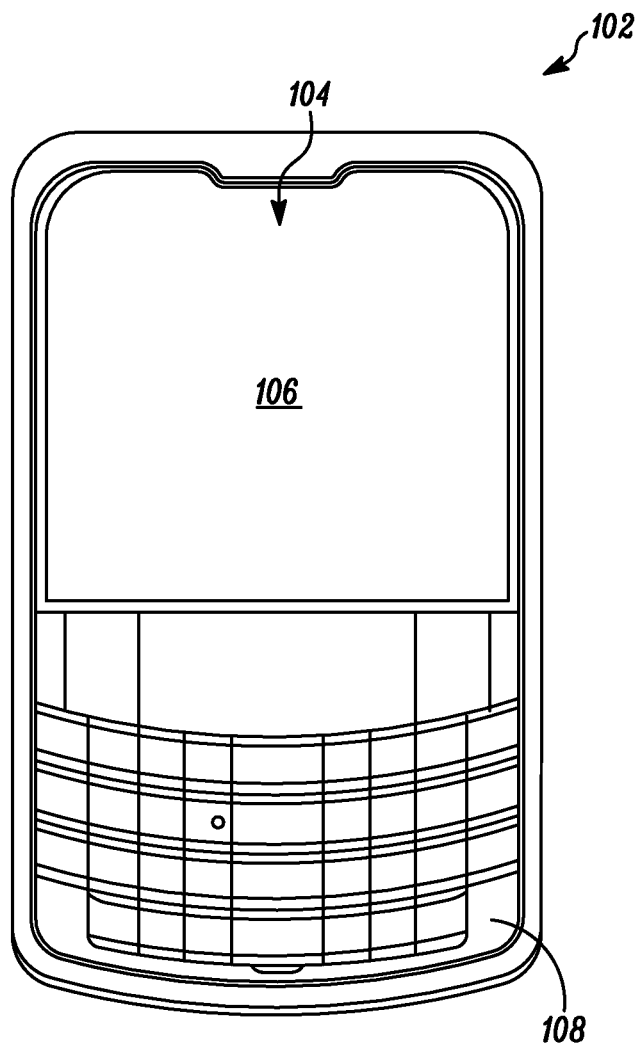
FIG. 1 is a front perspective view of an exemplary electronic device.

Referring now to FIG. 1, an exemplary mobile electronic device 102 is illustrated which can take the form of a mobile phone (as more fully described with respect to FIG. 2) and can include functions such as calling, emailing, texting, image acquisition, and internet browsing functions, as well as others. In other embodiments, the mobile electronic device can be one of a variety of other devices such as a personal digital assistant, remote controller, electronic book reader, or tablet. The electronic device 102 includes a movement sensing assembly, which in FIG. 1 takes the form of a touch detecting surface 104 associated with a display screen 106 to form a touch screen. The touch detecting surface 104 can be any of a variety of known touch detecting technologies such as a resistive technology, a capacitive technology, or an optical technology. As illustrated, the touch detecting surface 104 includes a light permeable panel or other technology which overlaps display screen 106 (such as a liquid crystal display screen). Alternately, the movement sensing assembly could be a touchpad (not overlapping the display screen), a joystick, a mouse, or other types of graphic user interfaces.

The movement sensing assembly can alternately take other forms such as the sensing assembly shown and described in U.S. patent application Ser. No. 12/471,062, titled "Sensing Assembly For Mobile Device" and filed on May 22, 2009. For example, such a sensing assembly can include a plurality of phototransmitters arranged to emit light outwardly in various directions, with at least one photoreceiver arranged to receive respective portions of transmitted light originating from each phototransmitter that has been reflected off an object (other configurations of phototransmitters and photoreceivers are also possible), and can also detect and identify various user gestures.

Optionally, the electronic device 102 may include a keypad 108 having numerous keys for inputting various user commands for operation of the device. Although the keypad 108 is shown as a QWERTY keypad, the keypad may be implemented as a Bell Telephone keypad (1-9,*,0, #), a custom keypad with buttons such as 'home' and 'backspace', or another type of keypad with programmable "soft" keys.

The electronic device 102 is operable to detect and identify various gestures by a user (where each gesture is a specified pattern of movement of an external object, such as a hand or one or more fingers, relative to the device), in one of a variety of known ways. A touch screen is advantageous because changeable graphics can be displayed directly underlying the touch detecting surface on which controlling hand gestures are applied.

Figure 2:
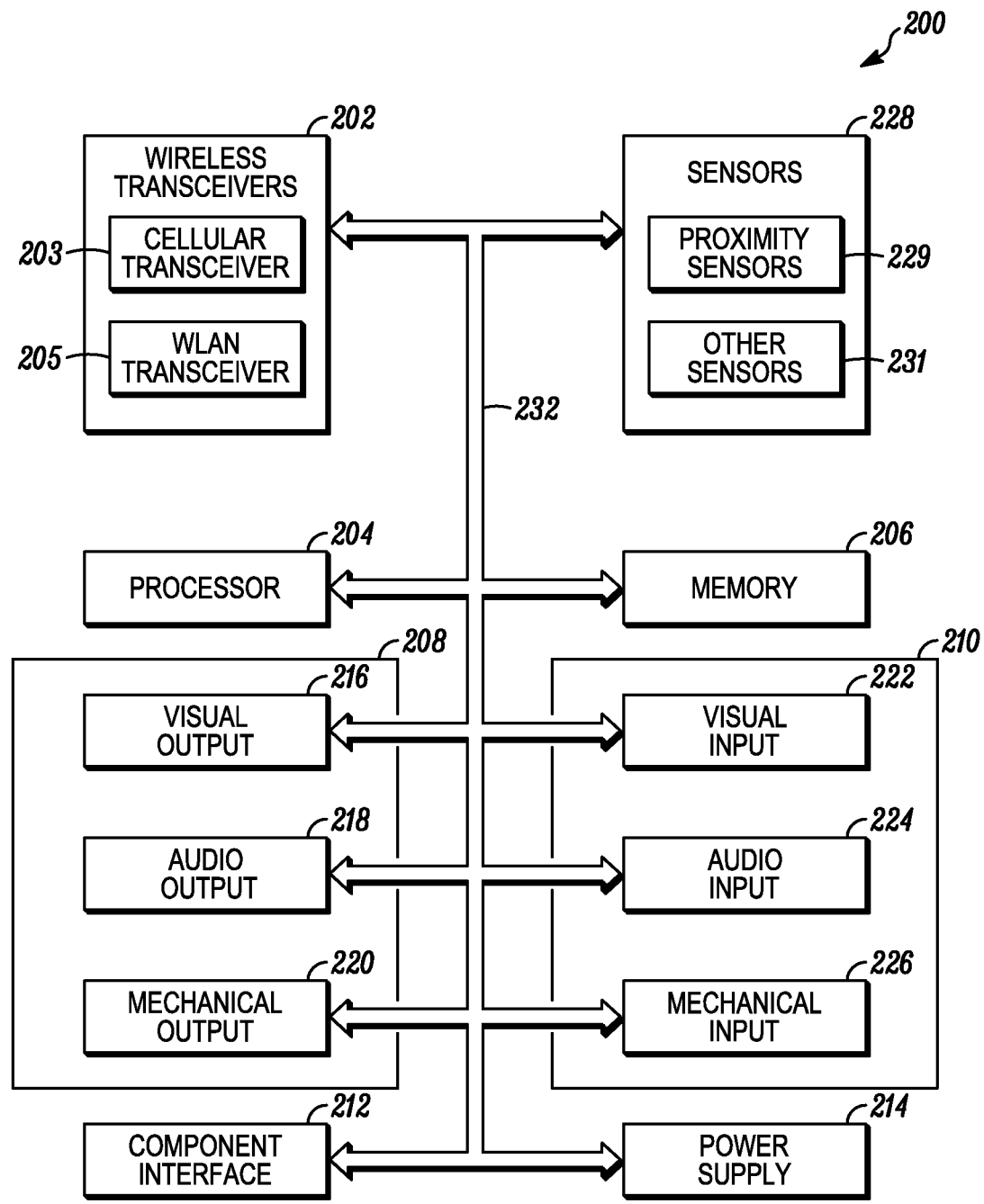
FIG. 2 is a block diagram of the exemplary electronic device of FIG. 1.

Referring to FIG. 2, a block diagram 200 illustrates exemplary internal components of the mobile smart phone implementation of the electronic device 102. These components can include wireless transceivers 202, a processor 204 (e.g., a microprocessor, microcomputer, application-specific integrated circuit, or the like), memory 206, one or more output components 208, one or more input components 210, and one or more sensors 228. The device can also include a component interface 212 to provide a direct connection to auxiliary components or accessories for additional or enhanced functionality, and a power supply 214, such as a battery, for providing power to the other internal components. All of the internal components can be coupled to one another, and in communication with one another, by way of one or more internal communication links 232, such as an internal bus.

The memory 206 can encompass one or more memory devices of any of a variety of forms (e.g., read-only memory, random access memory, static random access memory, dynamic random access memory, etc.), and can be used by the processor 204 to store and retrieve data. The data that is stored by the memory 206 can include operating systems, applications, and informational data. Each operating system includes executable code that controls basic functions of the electronic device, such as interaction among the various internal components, communication with external devices via the wireless transceivers 202 and/or the component interface 212, and storage and retrieval of applications and data to and from the memory 206.

As for programs (applications), each program includes executable code that utilizes an operating system to provide more specific functionality, such as file system service and handling of protected and unprotected data stored in the memory 206. Although many such programs govern standard or required functionality of the electronic device 102, in many cases the programs include applications governing optional or specialized functionality, which can be provided in some cases by third party vendors unrelated to the electronic device manufacturer.

Finally, with respect to informational data, this is non-executable code or information that can be referenced and/or manipulated by an operating system or program for performing functions of the mobile device 102. Such informational data can include, for example, data that is preprogrammed upon the electronic device 102 during manufacture, or any of a variety of types of information that is uploaded to, downloaded from, or otherwise accessed at servers or other devices with which the electronic device 102 is in communication during its ongoing operation.

The mobile device 102 can be programmed such that the processor 204 and memory 206 interact with the other components of the electronic device to perform a variety of functions, including interaction with the touch detecting surface 104 to receive signals indicative of gestures therefrom, evaluation of these signals to identify various gestures, and control of the device in the manners described below.

Although not specifically shown in FIG. 2, the processor can include various modules for detecting different gestures, such as single-finger glide (including its location), two-finger glide (including its location), tap (including its location), double-tap (including its location), and hold-and-drag (including its location) gesture detection modules. Further the processor can include various modules for initiating different activities such as launching an application, subdividing the display screen into portions, displaying a set of application icons in a portion, resizing an application from full-screen size such that it fits within a portion of the display screen, and vice versa (minimize and maximize functions), and data transfer functions. Detection of certain gestures (including the gesture's location and timing) may trigger specific activity modules. Thus, when a single-finger glide gesture detection module concludes that a single-finger has been swiped from one edge of the display screen to an opposite edge, it may trigger the subdividing activity module.

The wireless transceivers 202 can include both cellular transceivers 203 and a wireless local area network (WLAN) transceiver 205. Each of the wireless transceivers 202 utilizes a wireless technology for communication, such as cellular-based communication technologies including analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF, Bluetooth and IEEE 802.11 (a, b, g or n), or other wireless communication technologies.

Exemplary operation of the wireless transceivers 202 in conjunction with others of the internal components of the electronic device 102 can take a variety of forms and can include, for example, operation in which, upon reception of wireless signals, the internal components detect communication signals and the transceiver 202 demodulates the communication signals to recover incoming information, such as voice and/or data, transmitted by the wireless signals. After receiving the incoming information from the transceiver 202, the processor 204 formats the incoming information for the one or more output components 208. Likewise, for transmission of wireless signals, the processor 204 formats outgoing information, which may or may not be activated by the input components 210, and conveys the outgoing information to one or more of the wireless transceivers 202 for modulation as communication signals. The wireless transceiver(s) 202 convey the modulated signals to a remote device, such as a cell tower or an access point (not shown).

The output components 208 can include a variety of visual, audio, and/or mechanical outputs. For example, the output components 208 can include one or more visual output components 216 such as the display screen 106. One or more audio output components 218 can include a speaker, alarm, and/or buzzer, and one or more mechanical output components 220 can include a vibrating mechanism for example. Similarly, the input components 210 can include one or more visual input components 222 such as an optical sensor of a camera, one or more audio input components 224 such as a microphone, and one or more mechanical input components 226 such as the touch detecting surface 104 and the keypad 108 of FIG. 1.

The sensors 228 can include both proximity sensors 229 and other sensors 231, such as an accelerometer, a gyroscope, or any other sensor that can provide pertinent information, such as to identify a current location or orientation of the device 102.

Actions that can actuate one or more input components 210 can include for example, powering on, opening, unlocking, moving, and/or operating the device 102. For example, upon power on, a 'home screen' with a predetermined set of application icons can be displayed on the display screen 106.

Figure 3:
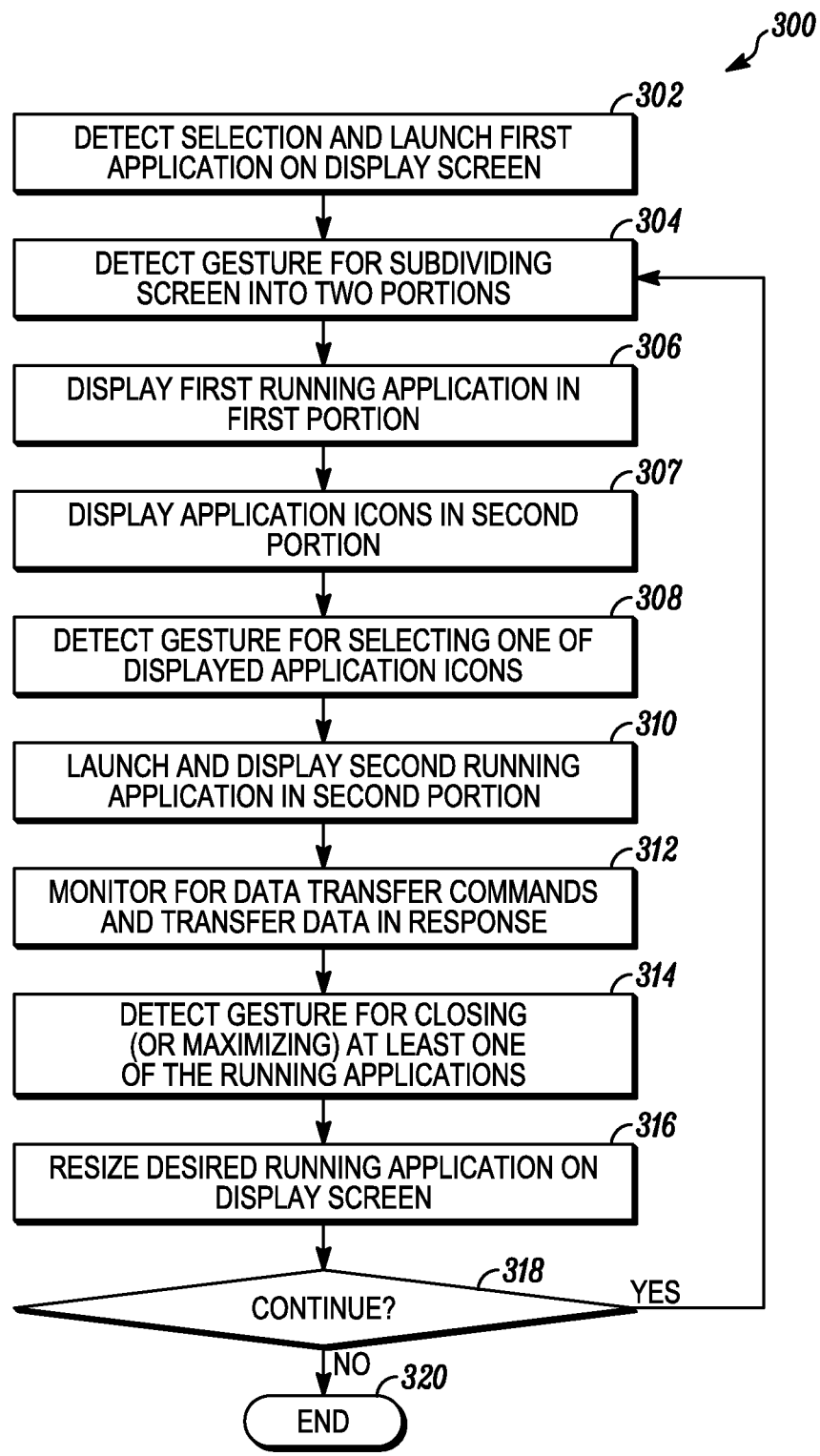
FIG. 3 illustrates an exemplary method for the electronic device of FIG. 1.
Figure 4:
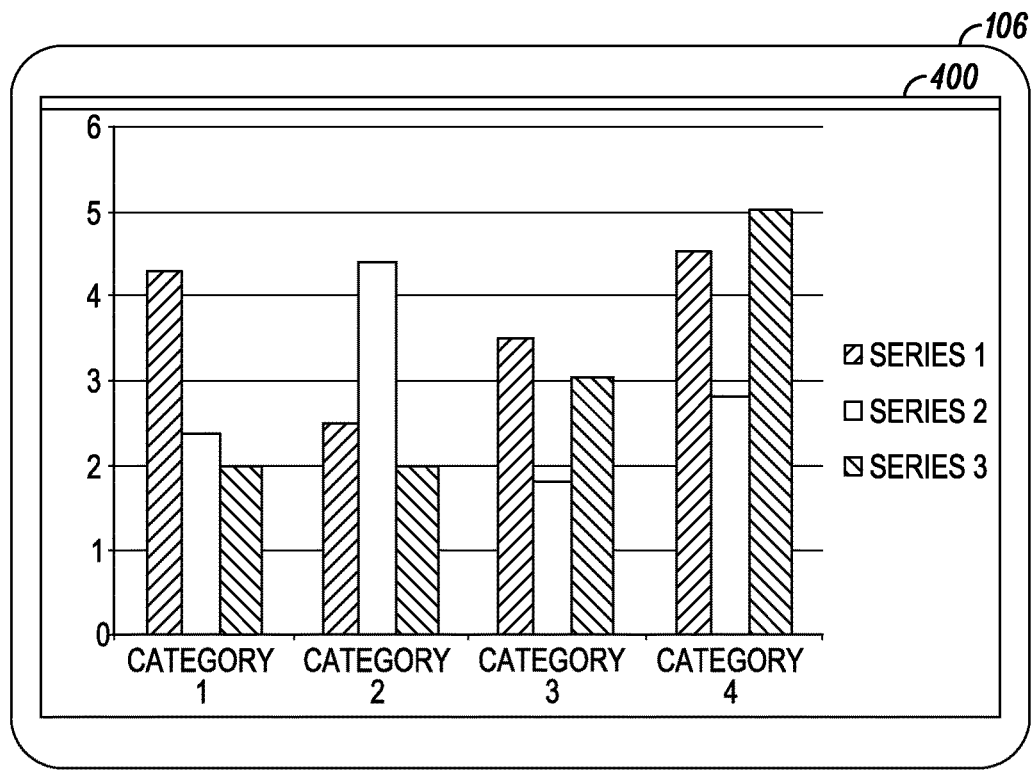
FIGS. 4-11 are front views of the exemplary electronic device of FIG. 1 illustrating the method of FIG. 3.

FIG. 3 illustrates a method 300 that can be performed by the electronic device 102, such as at a time when a set of application icons for selection are displayed on the display screen. The method begins at a step 302, wherein a desired first application is launched and displayed on the display screen in response to a user input command, such as a touch gesture selecting a desired one of the displayed application icons. An example of a first running application 400 displayed on display screen 106 is illustrated in FIG. 4. Due to the small screen size of portable electronic devices, active applications are usually displayed in a full-screen format as shown. Processing then proceeds to a step 304.

Figure 5:
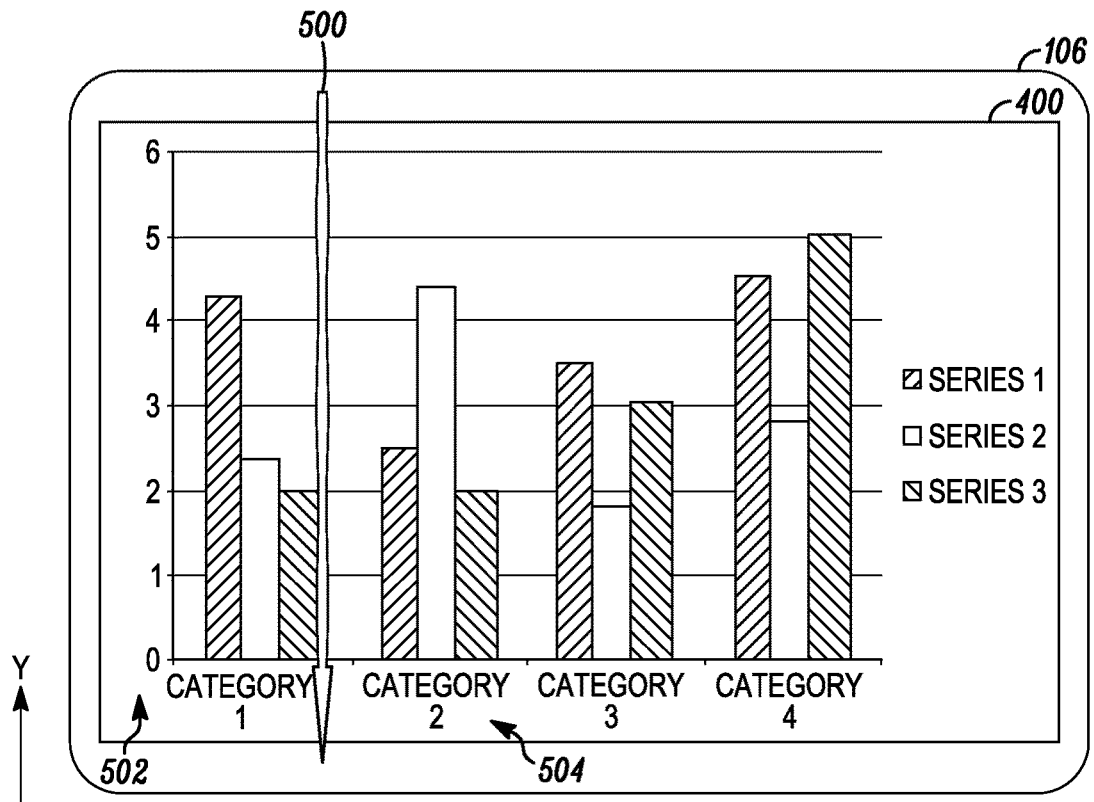
Figure 9:
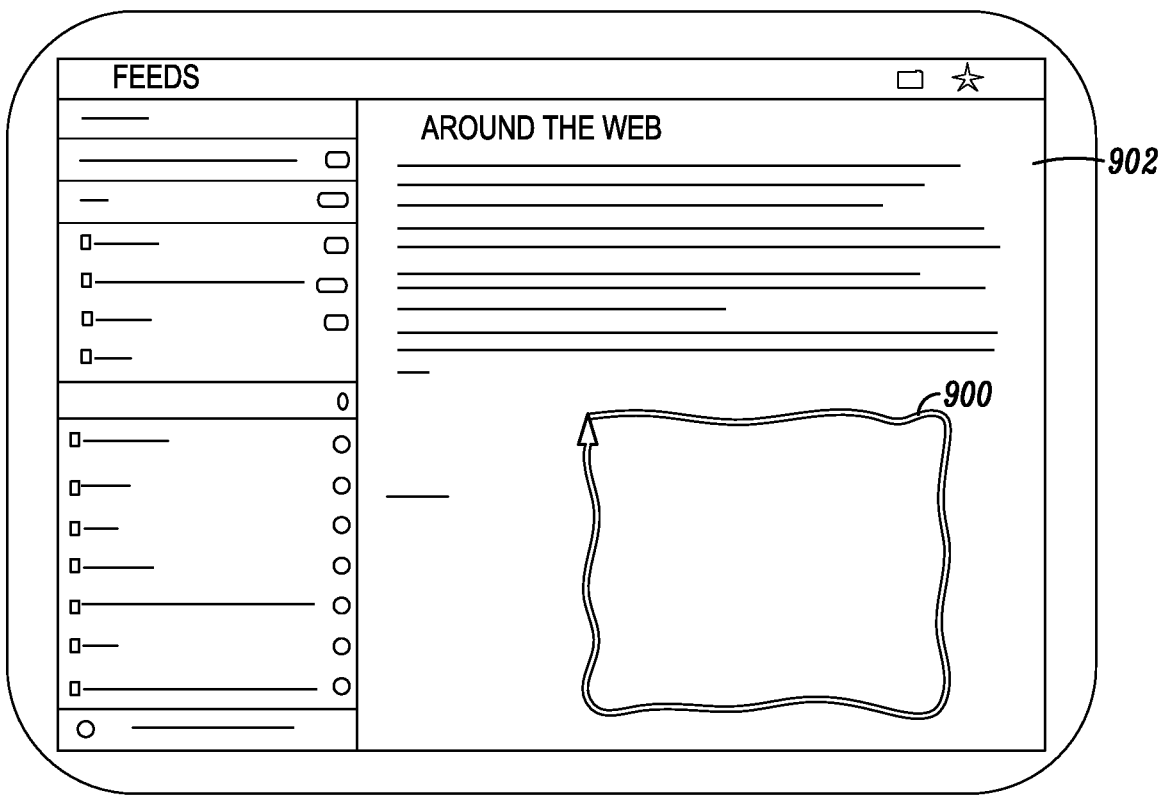

At step 304, the device 102 monitors signals from the touch detecting surface to detect a valid gesture for subdividing the display into a first portion and a second portion. For example, as schematically illustrated in FIG. 5, a valid subdividing gesture can be a slide gesture (indicated by arrow 500), which is movement of an object such as a finger generally in the xy plane in one direction with respect to the device. The illustrated slide gesture extends from the top to the bottom of the display screen 106 to define a left side portion 502 and a right side portion 504 of the display screen. A slide gesture extending from one side to the other side can also be a valid subdividing gesture, and can operate to subdivide the display screen into a top portion and a bottom portion. Another possible subdividing gesture can be a gesture that defines a bounded area 900 within the display screen, as schematically illustrated in FIG. 9. Processing then proceeds to a step 306.

Note that the slide gesture 500 demarcated the boundary 511 between the left side portion 502 and the right side portion 504. Although a linear, orthogonal gesture 500 is shown, due to human factors, the gesture itself may not be perfectly linear or orthogonal and the method 300 may interpret the gesture to be linear and orthogonal when creating the boundary 511. Additionally, the method may accept linear, slanted gestures, curved gestures, three-dimensional, and other types of gestures. Also, although touch screen gestures are described here (where a user directly touches an image to provide input), other gestures may be used, such as mouse or joystick gestures (where a pointing device is used to manipulate a pointer icon on an image) or three-dimensional gestures in space.

Figure 6:
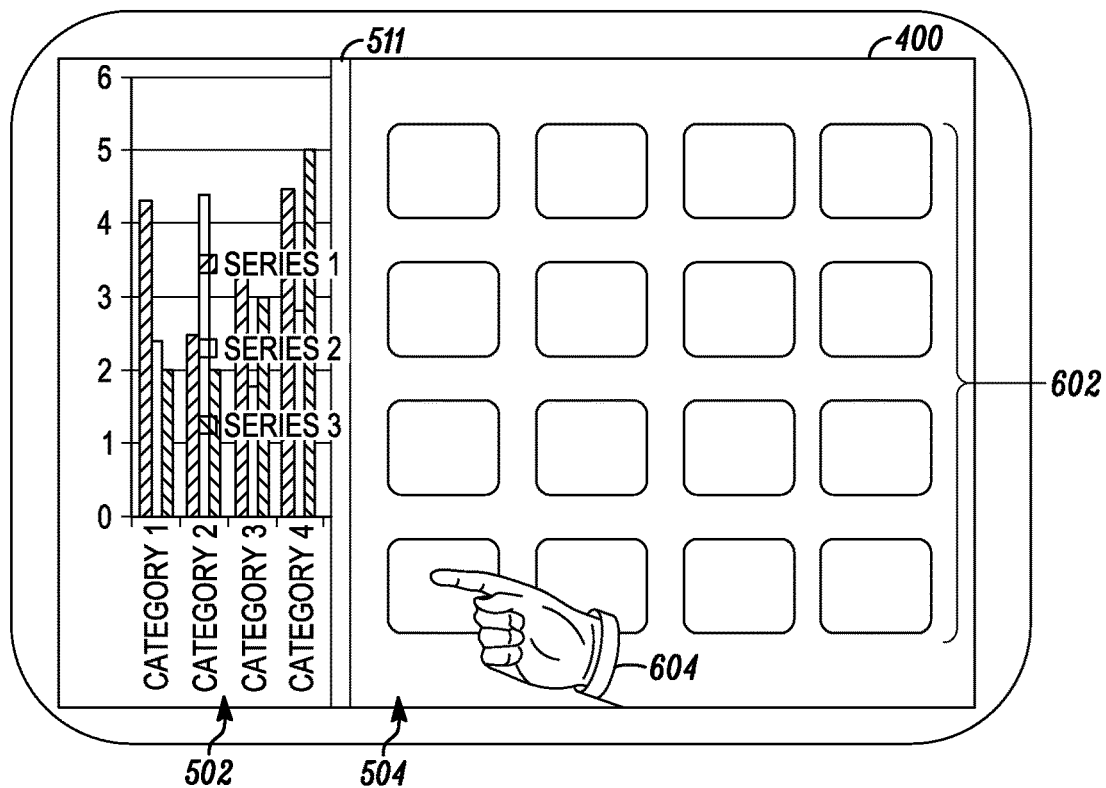

At step 306, the device 102 operates to display the first running application 400 in the first portion 502 (at a reduced size). At step 307, the device operates to display a predetermined set of application icons 602 in the second portion 504, such as illustrated in FIG. 6. The predetermined set of application icons 602 can include, for example, icons which correspond to one or more installed applications, recently closed applications, favorite applications, and applications running in the background. As shown, the application 400 is displayed on the left side portion 502, and the application icons are displayed on the right side portion 504, although in other embodiments, which portion receives the reduced size application can be set as a default, as a preference, or can be changed using a gesture. For example, a default or user-programmable setting may consistently place the first running application in the smaller portion. Alternately, a default or user-programmable setting may consistently place the first running application in a left-side or bottom-side portion. As an additional example, a two-finger slide gesture from left to right can operate to drag the contents of portion 502 to portion 504, while the contents of portion 504 are transferred to portion 502. Processing then proceeds to a step 308.

At step 308, while the application icons are displayed, the device monitors signals from the touch detecting surface 104 to detect a valid gesture for selecting one of the application icons. Such a selection gesture can be a simple touch by a user's finger 604 (or stylus) in an area corresponding to a desired selected icon, as schematically illustrated in FIG. 6. Processing then proceeds to a step 310.

Figure 7:
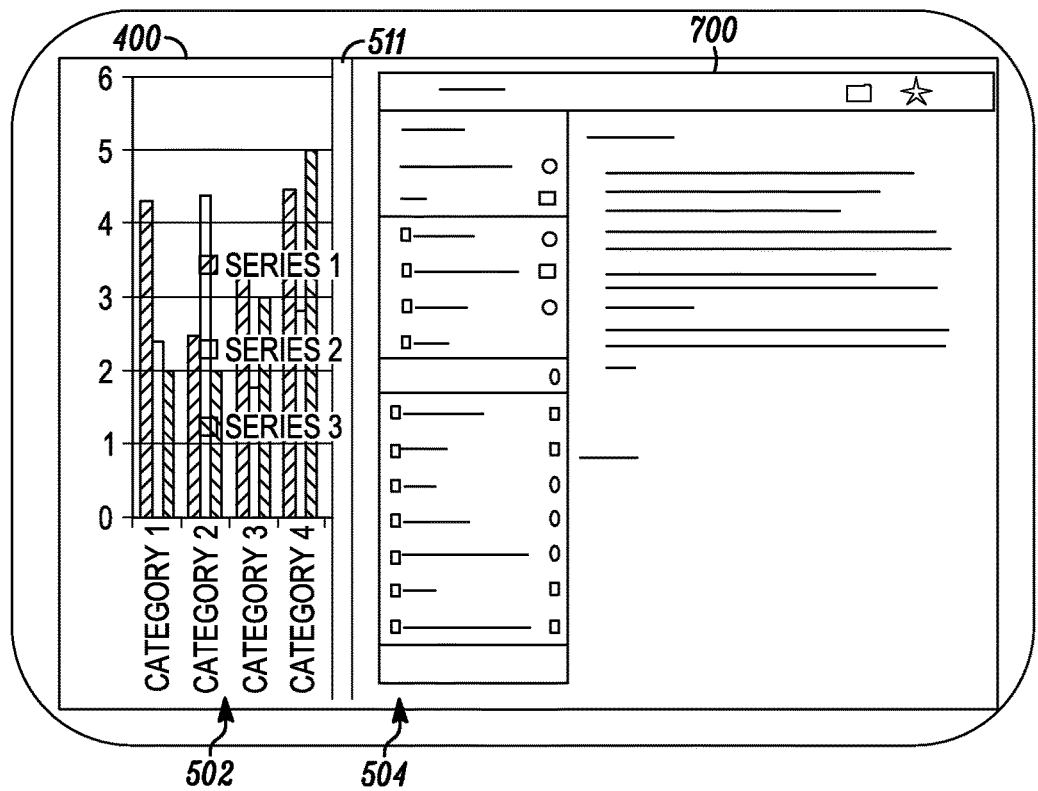

At step 310, the device 102 operates to launch and display a second application, which is the application corresponding to the selected icon, in the second portion 504 of the display screen. In this manner, the first application 400 is displayed in the first portion 502 and the second application 700 is displayed in the second portion of the display screen, such as illustrated in FIG. 7. Processing then proceeds to a step 312.

At step 312, while both applications are displayed, the electronic device monitors for data transfer commands, and in response operates to effect data transfer between the first and the second applications, using known techniques such as cut and paste or drag and drop. Processing then proceeds to a step 314.

At step 314, while both running applications are displayed, the device monitors signals from the touch detecting surface to detect a valid gesture for closing one of the running applications, or a valid gesture for maximizing one of the running applications. For example, a close gesture can be accomplished by a pinching in of two fingers in the portion of the display screen which includes the application to be closed, or perhaps a single touch in an appropriately marked or designated 'close' location corresponding to one of the running applications. Similarly, a maximize gesture can be accomplished by moving two fingers apart in either the first or the second portion, or perhaps a single touch in an appropriately marked or designated maximize location corresponding to one of the running applications. Processing then proceeds to a step 316.

Figure 8:
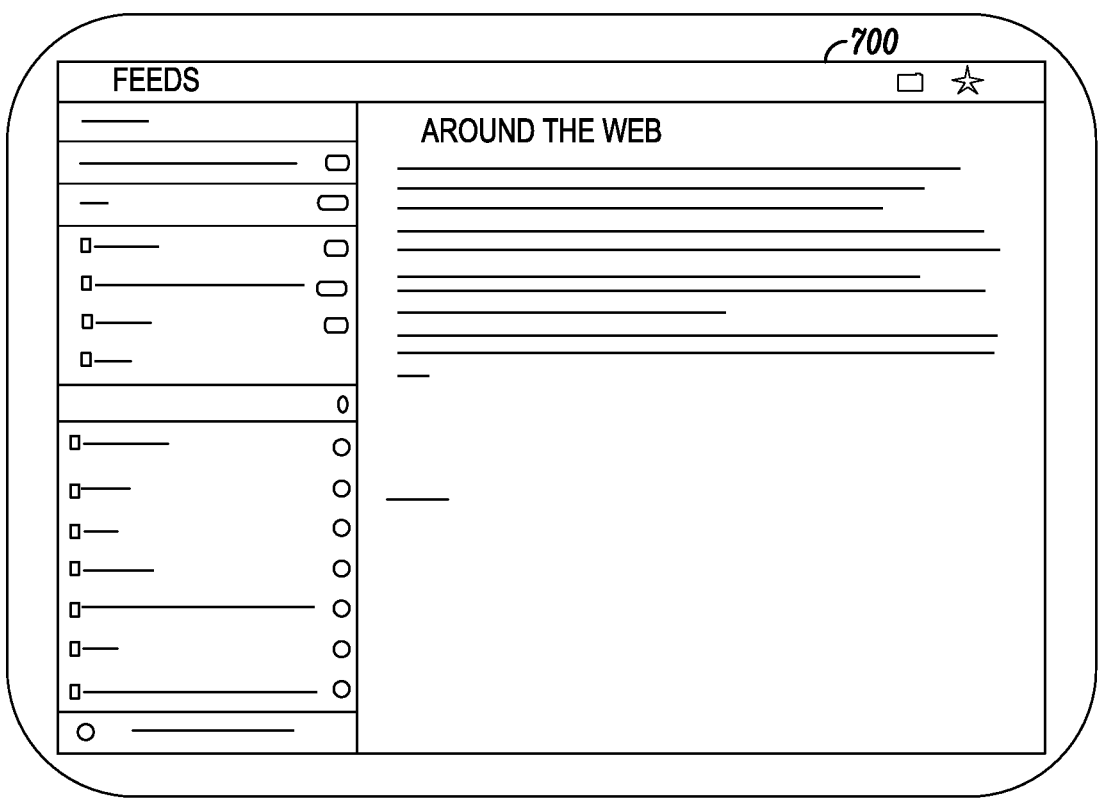

At step 316, the device 102 acts to resize the application corresponding to the maximize gesture, while closing the other application (or having it run in the background), such as illustrated in FIG. 8, wherein the presumed selected application (the running second application 700) is displayed on substantially the entire display screen. Alternately, the device acts to close the application corresponding to the close gesture, while increasing the size of the other application.

At a step 318, it is determined whether to continue with the current application 700 as the launched application. If yes, the processing can again to proceed to step 304. If no, for example, if an exit command is detected, then the process ends at 320.

Figure 10:
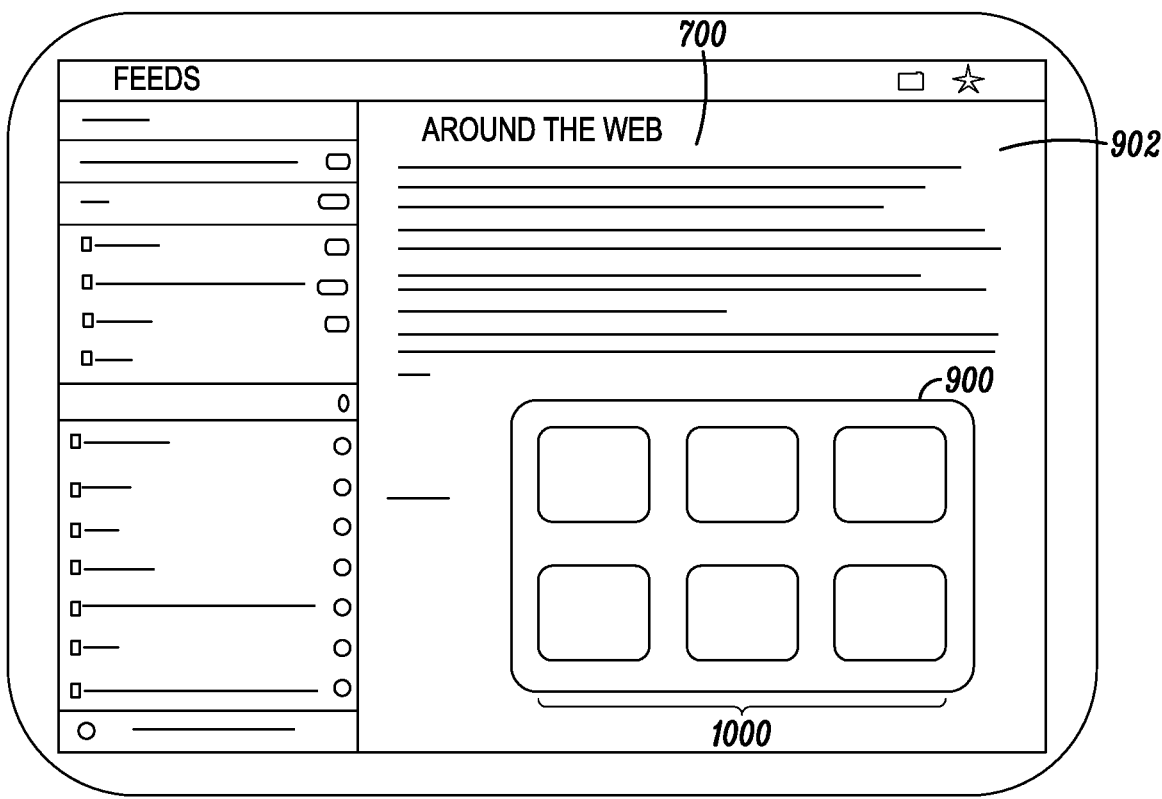
Figure 11:
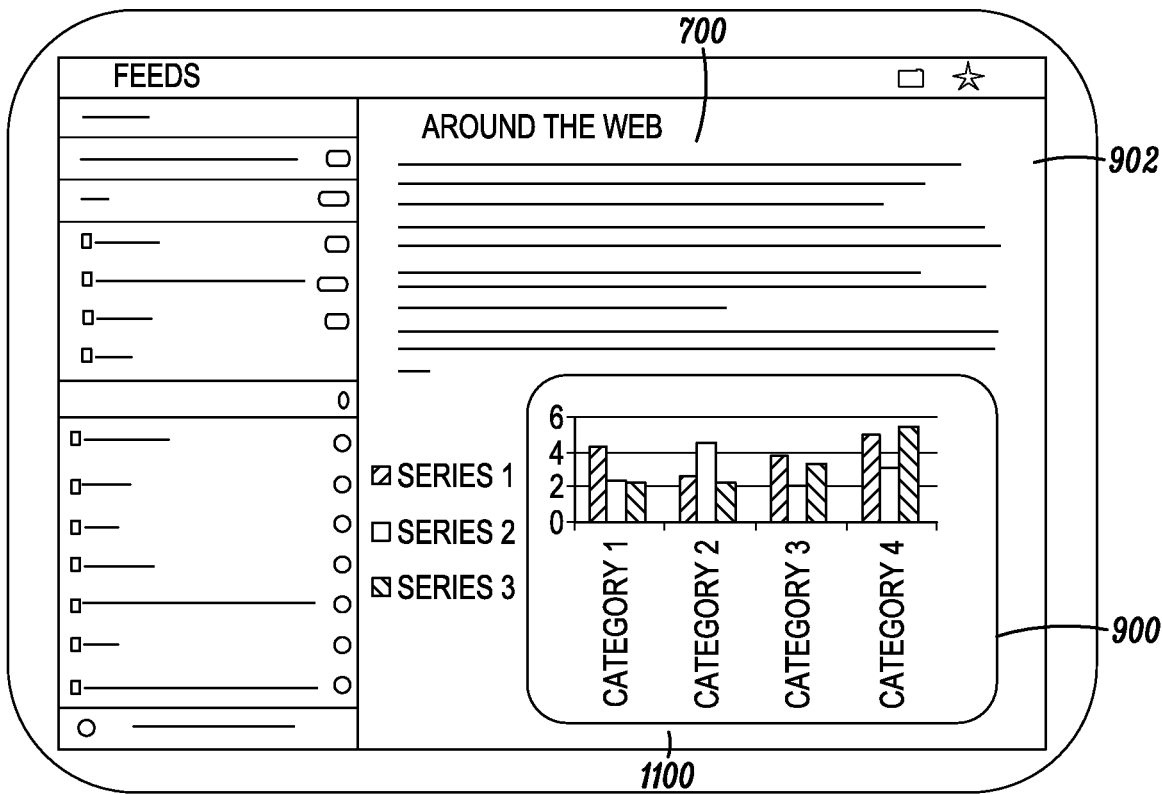

FIGS. 9-11 provide another example of the operation of the electronic device. FIG. 9 shows the display screen divided into a first portion 900 and a second portion 902. FIG. 10 shows a set of application icons 1000 which can then displayed in portion 900. FIG. 10 illustrates that another application 1100 can be selected to be displayed in portion 900 while the application 700 is displayed in portion 902.

In this manner, gestures provide a user friendly and intuitive way to manage and switch between tasks. Although the implementations described her show a single subdividing gesture for dividing a display into two portions (e.g., a line "|" or an enclosed area "☐"), a double subdividing gesture can be used to divide the display into four portions (e.g., a cross or plus "+"), or three portions (e.g. a "T"), and other gestures or series of gesture can also be defined as valid subdividing gestures.

As understood by those in the art, processor 204 executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It is specifically intended that the present invention not be limited to the embodiments and illustrations contained herein, but include modified forms of those embodiments, including portions of the embodiments and combinations of elements of different embodiments as come within the scope of the following claims.

The invention claimed is:

1. A mobile electronic device comprising:
  a touchscreen configured to display information and to provide signals indicative of one or more touch gestures performed at the touchscreen; and
  a processor in electronic communication with the touchscreen, the processor configured to:
    execute a first application;
    evaluate the signals provided by the touchscreen to identify a first touch gesture performed at the touchscreen that causes the touchscreen to display information for the first application in a first portion of the touchscreen and to display a plurality of application icons in a second portion of the touchscreen, wherein the second portion of the touchscreen in which the application icons are displayed comprises an area that is included in at least part of the first portion of the touchscreen in which the information for the first application is displayed;
    evaluate the signals provided by the touchscreen to identify a second touch gesture performed at the touchscreen selecting one of the plurality of application icons in the second portion of the touchscreen;
    execute a second application corresponding to the selected one of the plurality of application icons;
    while the processor executes the first application and the second application, evaluate the signals provided by the touchscreen to identify a third touch gesture performed at the touchscreen; and
    execute a third application corresponding to the third touch gesture to cause the touchscreen to display the information for the first application, information for the second application, and information of the third application in different portions of the touchscreen.

2. The mobile electronic device of claim 1, wherein, prior to evaluating the signals to identify the first touch gesture, the processor is configured to cause the touchscreen to display the information for the first application in a full-screen format.

3. The mobile electronic device of claim 1, wherein the processor is further configured to: evaluate the signals to identify a close gesture corresponding to the first application; and responsive to identifying the close gesture, cause the touchscreen to discontinue displaying the information for the first application.

4. The mobile electronic device of claim 3, wherein the processor is further configured to:
  before identifying the close gesture, evaluate the signals to identify a maximize gesture corresponding to the first application; and
  responsive to identifying the maximize gesture, cause the touchscreen to display the information for the first application in a full-screen format while the second application and the third application each executes as a background application.

5. The mobile electronic device of claim 1, wherein the processor is further configured to:
  while causing the touchscreen to display the information for the first application, the information for the second application, and the information for the third application in different portions of the touchscreen:
    evaluate the signals provided by the touchscreen to identify a data transfer touch gesture performed at one or more portions of the touchscreen; and
    responsive to identifying the data transfer touch gesture, transfer, from the first application and to the second application, data that corresponds to at least some of the displayed information for the first application.

6. The mobile electronic device of claim 5,
  wherein the data transfer touch gesture comprises a drag-and-drop gesture, and
  wherein the processor is configured to transfer the data from the first application to the second application at least by being configured to transfer, to the second application, a user-selected portion of the displayed information for the first application.

7. The mobile electronic device of claim 5,
  wherein the data transfer touch gesture comprises a cut-and-paste gesture, and
  wherein the processor is configured to transfer the data from the first application to the second application at least by being configured to transfer, to the second application, a user-selected portion of the displayed information for the first application.

8. A method comprising:
  executing, by a mobile electronic device, a first application;
  evaluating, by the mobile electronic device, signals provided by a touchscreen of the mobile electronic device to identify a first touch gesture performed at the touchscreen that causes the touchscreen to display information for the first application in a first portion of the touchscreen and to display a plurality of application icons in a second portion of the touchscreen, wherein the second portion of the touchscreen in which the application icons are displayed comprises an area that is included in at least part of the first portion of the touchscreen in which the information for the first application is displayed;
  evaluating, by the mobile electronic device, the signals provided by the touchscreen to identify a second touch gesture performed at the touchscreen selecting one of the plurality of application icons in the second portion of the touchscreen;
  executing, by the mobile electronic device, a second application corresponding to the selected one of the plurality of application icons;

while first application and the second application executes at the mobile electronic device, evaluating the signals provided by the touchscreen to identify a third touch gesture performed at the touchscreen; and executing, by the mobile electronic device, a third application corresponding to the third touch gesture to cause the touchscreen to display the information for the first application, information for the second application, and information of the third application in different portions of the touchscreen.

9. The method of claim 8, further including:

evaluating, by the mobile electronic device, the signals provided by the touchscreen to identify a close gesture corresponding to the first application; and responsive to identifying the close gesture, causing, by the mobile electronic device, the touchscreen to discontinue displaying the information for the first application.

10. The method of claim 9, further comprising:

before identifying the close gesture, evaluating, by the mobile electronic device, the signals provided by the touchscreen to identify a maximize gesture corresponding to the first application; and responsive to identifying the maximize gesture, causing, by the mobile electronic device, the touchscreen to display the information for the first application in a full-screen format while the second application and the third application each executes as a background application.

11. The method of claim 8, further comprising:

prior to evaluating the signals to identify the first touch gesture, causing, by the mobile electronic device, the touchscreen to display the information for the first application in a full-screen format.

12. The method of claim 8, further comprising:

while causing the touchscreen to display the information for the first application, the information for the second application, and the information for the third application in different portions of the touchscreen:

evaluating, by the mobile electronic device, the signals provided by the touchscreen to identify a data transfer touch gesture performed at one or more portions of the touchscreen; and responsive to identifying the data transfer touch gesture, transferring, by the mobile computing device from the first application and to the second application, data that corresponds to at least some of the displayed information for the first application.

13. The method of claim 12, wherein the data transfer touch gesture comprises a drag-and-drop gesture, and wherein transferring the data from the first application to the second application comprises transferring, to the second application, a user-selected portion of the displayed information for the first application.

14. The method of claim 12, wherein the data transfer touch gesture comprises a cut-and-paste gesture, and wherein transferring the data from the first application to the second application comprises transferring, to the second application, a user-selected portion of the displayed information for the first application.

15. A non-transitory computer-readable storage medium storing instructions that, when executed, cause a mobile electronic device to perform operations comprising:

executing a first application;

evaluating signals provided by a touchscreen of the mobile electronic device to identify a first touch gesture performed at the touchscreen that causes the touchscreen to display information for the first application in a first portion of the touchscreen and to display a plurality of application icons in a second portion of the touchscreen, wherein the second portion of the touchscreen in which the application icons are displayed comprises an area that is included in at least part of the first portion of the touchscreen in which the information for the first application is displayed;

evaluating the signals provided by the touchscreen to identify a second touch gesture performed at the touchscreen selecting one of the plurality of application icons in the second portion of the touchscreen;

executing a second application corresponding to the selected one of the plurality of application icons;

while first application and the second application executes at the mobile electronic device, evaluating the signals provided by the touchscreen to identify a third touch gesture performed at the touchscreen; and executing a third application corresponding to the third touch gesture to cause the touchscreen to display the information for the first application, information for the second application, and information of the third application in different portions of the touchscreen.

16. The non-transitory computer-readable storage medium of claim 15, wherein the operations further comprise:

evaluating the signals provided by the touchscreen to identify a close gesture corresponding to the first application; and responsive to identifying the close gesture, causing the touchscreen to discontinue displaying the information for the first application.

17. The non-transitory computer-readable storage medium of claim 16, wherein the operations further comprise:

before identifying the close gesture, evaluating the signals provided by the touchscreen to identify a maximize gesture corresponding to the first application; and responsive to identifying the maximize gesture, causing the touchscreen to display the information for the first application in a full-screen format while the second application and the third application each executes as a background application.

18. The non-transitory computer-readable storage medium of claim 15, wherein the operations further comprise:

prior to evaluating the signals to identify the first touch gesture, causing the touchscreen to display the information for the first application in a full-screen format.

19. The non-transitory computer-readable storage medium of claim 15, wherein the operations further comprise:

while causing the touchscreen to display the information for the first application, the information for the second application, and the information for the third application in different portions of the touchscreen:

evaluating the signals provided by the touchscreen to identify a data transfer touch gesture performed at one or more portions of the touchscreen; and responsive to identifying the data transfer touch gesture, transferring, from the first application and to the second application, data that corresponds to at least some of the displayed information for the first application.

20. The non-transitory computer-readable storage medium of claim 19,
wherein the data transfer touch gesture comprises a drag-and-drop gesture, and
wherein transferring the data from the first application to the second application comprises transferring, to the second application, a user-selected portion of the displayed information for the first application.

* * * * *